Dec. 22, 1936.  J. R. DOWNES  2,065,123
SEWAGE TREATMENT
Filed Nov. 20, 1933
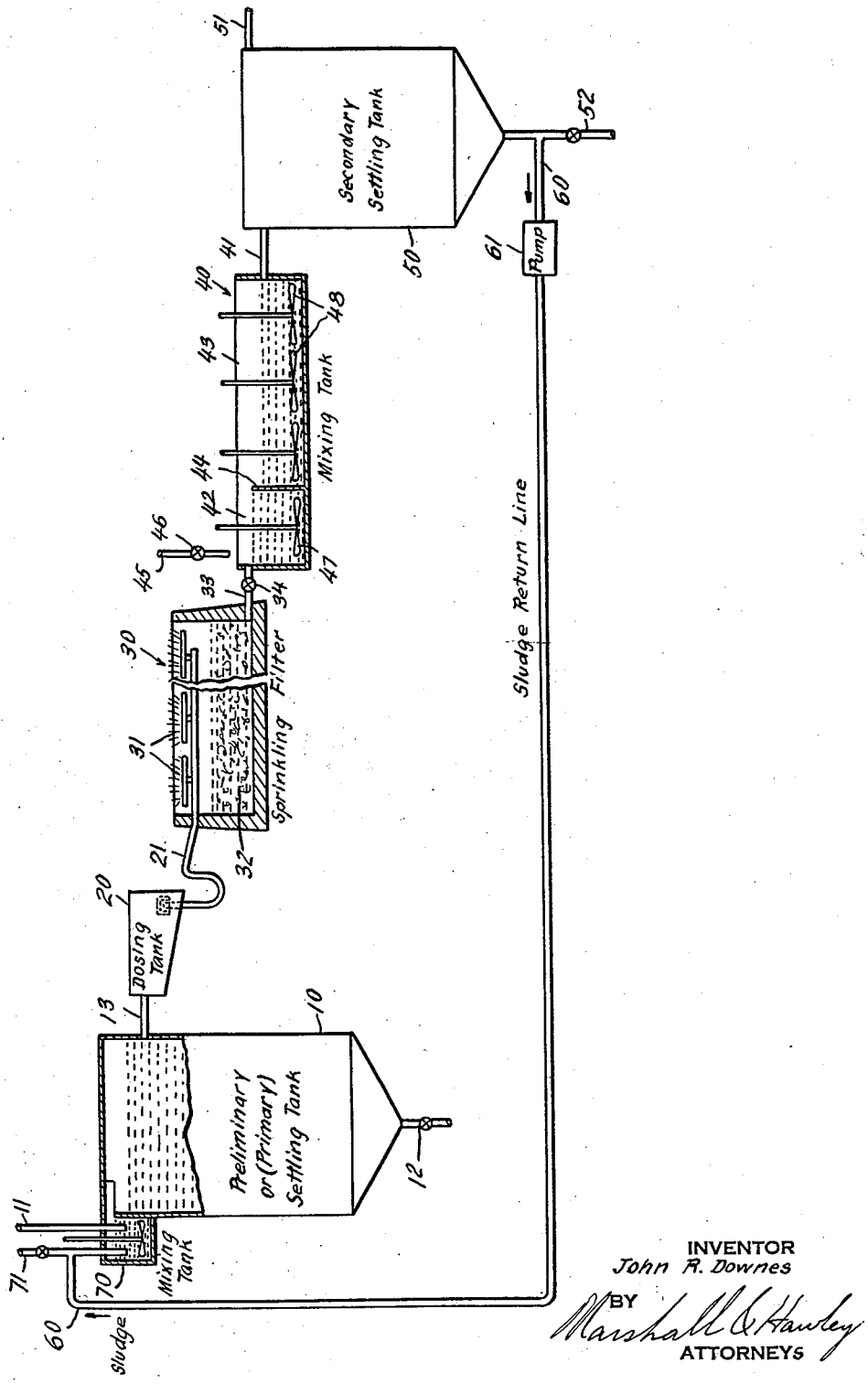
INVENTOR
John R. Downes
BY
Marshall & Hawley
ATTORNEYS Patented Dec. 22, 1936

2,065,123

UNITED STATES PATENT OFFICE 2,065,123

SEWAGE TREATMENT

John R. Downes, Middlesex, N. J., assignor to Pacific Flush-Tank Company, New York, N. Y., a corporation of Illinois Application November 20, 1933, Serial No. 698,734

9 Claims. (Cl. 210—2)

This invention relates to an improved method of and apparatus for sewage treatment.

Its object is to provide a simple and inexpensive way of removing the suspended solids, and the biological oxygen demand from the sewage. More specifically, it relates to a new way of introducing and using chemicals in a treatment plant which includes a sprinkling filter or other biological oxidizing device or devices, whereby the capacity and efficiency of such a plant are increased. This method also includes the return of some of the precipitated sludge to the incoming sewage and the use thereof with or without added chemicals in a primary settling tank to accelerate clarification and to deodorize the raw sewage.

Other objects of the invention will appear in the following specification and the novel features thereof are set forth in appended claims.

In the art of sewage disposal, settling of the solids from the liquid at one or more points is standard practice. Plain settling or sedimentation is the common practice in nearly all sewage disposal plants. Chemical precipitation has been used from time to time in connection with sedimentation but has not been satisfactory because of its high cost due to the large quantities of chemicals heretofore needed and to the large volume of sludge thereby produced.

Sedimentation is used for clarifying the sewage for treatment in trickling filters or in other oxidation devices. Such installations have objectional features. Odors are liberated at the sprays. Filter flies, which breed in them are eliminated only by submerging the filter material periodically. The discharge of the flood water causes unloading of the filters and this unloading results in the temporary deterioration and/or turbidity of the effluent.

I have discovered that a combination of chemical treatment with settling tanks and trickling filters under conditions which I have developed, preserves the best features of all of the methods above described and eliminates the objectionable features of each. More particularly, I have discovered that treatment of sewage by trickling filters or other biological oxidizing devices, renders the effluent from them in optimum condition for chemical treatment so that complete and effective clarification may be secured with a minimum dosage of chemicals. Specifically, the organic combinations in raw or settled sewage offer stubborn resistance to the coagulating effects of such chemicals as ferric or aluminum salts, which resistance is greatly reduced by a prior treatment in such oxidizing devices. Furthermore, the chemical treatment of the effluent from the oxidizing devices completely removes the undesirable turbidity of such effluents during the unloading periods following submergence as a means of fly control, thus nullifying the bad temporary result of submerging the filters and assuring a plant effluent of the highest quality at all times.

I have also discovered that the sludge produced by chemical treatment of the effluent from trickling filters or other oxidizing devices is an active clarifier of raw sewage and a good odor absorbing medium, and that such sludge, either alone or combined with additional doses of chemicals, is capable of reducing the organic load in the sewage applied to the filters, beyond the limits which could be obtained by plain sedimentation and with much less chemical, than would be required without the return of sludge taken from the effluent from the filter or oxidizing device.

The drawing is a flow sheet or diagrammatic representation of an apparatus which embodies this invention and by means of which the novel method herein described may be carried out.

10 designates a preliminary settling tank into which sewage is introduced through a pipe 11. Sediment may be removed from the bottom of this tank through a valved pipe 12. 13 is a pipe which leads the effluent from tank 10 to a dosing tank 20 from which it flows intermittently through a pipe 21 to the jets 31 of a sprinkling filter 30. 32 is the filter filler of rocks, gravel or the like. 33 is a pipe leading from the base of the sprinkling filter to a mixing tank 40. 34 is a valve in pipe 33. 41 is a pipe from mixing tank 40 to a secondary settling tank 50 from which the final effluent free from suspended solids is discharged through a pipe 51.

The apparatus shown is a standard arrangement with the exception of the interposition of a mixing tank 40 between the sprinkling filter 30 and the secondary settling tank 50. The sprinkling filter is shown as an example of an oxidizing device.

The mixing tank comprises a compartment 42 and a compartment 43 separated by a baffle plate 44. A desired amount of coagulating chemical such as a ferric or aluminum salt, or a solution thereof is introduced into the compartment 42 through a pipe 45 controlled by a valve 46. 47 is a stirrer which is run at high speed to produce in compartment 42 a violent agitation and a thorough mixing of the chemicals and the sewage. The mixture then runs through compartment 43 where it is maintained in its desired condition by a plurality of slow speed stirrers 48, and finally runs out through pipe 41 to the secondary settling tank 50.

Before describing the other parts of the apparatus shown in the drawing, I will describe the operation of such of the parts as have been pointed out specifically. The operation of clarifying sewage in the preliminary settling tank 10, leading it through a dosing tank 20 and oxidizing it in a sprinkling filter 30 is the same as that heretofore used.

In treatment of sewage on a precipitation basis it is necessary to add enough of the coagulating chemical to raise the hydrogen-ion-concentration to a definite end-point. Until this end-point is reached, the salt simply goes into solution, and again, beyond the specific end-point it redissolves. This end-point varies with different chemicals and with some coagulants any variation in either direction from the specific critical end-point is disastrous. It is an object of my invention to provide a means of effecting the desired precipitation with a minimum amount of chemicals under conditions which can be controlled easily.

I have found that the oxidation of the settling tank effluent removes about seventy-five percent of the resistance of the sewage to the coagulating effect of chemicals so that the amount of chemicals required for complete clarification is greatly reduced by introducing the chemicals to the clarified sewage after it has been oxidized. With the former methods the amount of chemical required varies from time to time with variations in the character of the raw sewage, these variations, however, are eliminated by the passage of the sewage through an oxidizing device such as a sprinkling filter bed.

I have also found that a saving of chemicals is effected by a violent and somewhat continued agitation of the sewage at the time the chemicals are added. The effect of the coagulant then becomes proportional to the amount of coagulant introduced up to the critical end-point and the coagulant causes precipitation instead of going into solution. Thus the sewage is not rendered reacid, no lime is needed to complete the reaction and a definite degree of clarification can be acomplished without producing an excessive volume of sludge. In former chemical precipitation practice the volume of sludge is increased three hundred to four hundred percent before any clarification of the sewage is procured. With violent initial agitation as much as fifty percent clarification of the sewage (in terms of organic load) may be secured with only about ten percent increase in volume of sludge.

With the system herein described two hundred pounds of chemicals, per million gallons of sewage, will do the work for which as much as fourteen hundred pounds has been required by former methods.

It has been mentioned that the filler 32 of the sprinkling filter is a breeding place for filter flies. These are eliminated by closing valve 34 and flooding the filter. After such submergence the liquid is withdrawn by opening valve 34. In former installations this withdrawal causes a turbidity of the effluent. With my arrangement this turbidity is eliminated by manipulating valve 46 and introducing a larger amount of chemicals to mixing tank 40 during the periods of withdrawal.

Between the bottom of the secondary settling tank 50 and its valved discharge pipe 52 is a conduit 60 which leads through a variable pump 61 to a mixing tank 70 on the side of tank 10. 71 is a valved pipe through which chemicals can be introduced into the mixing tank 70.

By this arrangement the sludge from tank 50 is to be mixed with the sewage entering tank 10, through pipe 11. Here the sludge, which has been subjected to chemical treatment, becomes mixed with the incoming raw sewage on which it acts as a deodorizer and accelerates clarification. Its effect may be increased by the addition of a desired amount of chemicals introduced through the pipe 71. In the latter case, the returned sludge forms a nucleus for the formation of floc.

By the use of this arrangement and method the volume of sewage which can be successfully treated in a given area is greatly increased. Complete removal of suspended solids or better and uniform clarification may be obtained at all times with great efficiency and at low cost. The saving in cost of chemicals over former chemical precipitation methods is as high as seventy-five percent. As the total amount of sludge produced by this chemical treatment is only about ten percent greater than would be the case if no chemicals were used, compared with the undesired increase of three hundred to four hundred percent in the volume of sludge obtained by former chemical precipitation methods, the cost of sludge disposal is thus greatly reduced.

What I claim is:

1. The herein described method of treating sewage which comprises preliminary settling, subjecting the effluent to biological oxidation, mixing the resultant effluent with a coagulating chemical, settling the mixture and using matter settled from the mixture, in the preliminary settling step.

2. The herein described method of treating sewage which comprises preliminary settling, subjecting the effluent to biological oxidation, mixing the resultant effluent with a coagulating chemical, settling the mixture and using matter settled from the mixture with added coagulating chemical, in the preliminary settling step.

3. Sewage disposal apparatus comprising a primary settling tank, a biological oxidizing device connected therewith, a mixing tank connected with the oxidizing device, means for introducing chemical material into said mixing tank, a secondary settling tank, a connection between the mixing tank and the secondary settling tank, and means for returning material from the lower part of the secondary settling tank to the upper part of the primary settling tank.

4. Sewage disposal apparatus comprising a primary settling tank, a biological oxidizing device connected therewith, a mixing tank connected with the oxidizing device, means for introducing chemical material into said mixing tank, a secondary settling tank, a connection between the mixing tank and the secondary settling tank, means for returning material from the lower part of the secondary settling tank to the upper part of the primary settling tank, and means for introducing chemical material with said returned material into the preliminary settling tank.

5. Sewage disposal apparatus comprising a primary settling tank, a sprinkling filter connected therewith, a mixing tank, a connection between the filter and the mixing tank, means for introducing chemical material into the mixing tank, a secondary settling tank, a connection between the mixing tank and the secondary settling tank, and means for returning material from the lower part of the secondary settling tank to the upper part of the primary settling tank.

6. Sewage disposal apparatus comprising a primary settling tank, a sprinkling filter connected therewith, a mixing tank, a valved connection between the filter and the mixing tank, regulable means for introducing chemical material into the mixing tank, a secondary settling tank, a connection between the mixing tank and the secondary settling tank, and regulable means for returning material from the lower part of the secondary settling tank to the upper part of the primary settling tank.

7. Sewage disposal apparatus comprising a primary settling tank, a sprinkling filter connected therewith, a mixing tank, a valve connection between the filter and the mixing tank, regulable means for introducing chemical material into the mixing tank, a secondary settling tank, a connection between the mixing tank and the secondary settling tank, regulable means for returning material from the lower part of the secondary settling tank to the upper part of the primary settling tank, and means for introducing chemical material into said returned material.

8. Sewage disposal apparatus comprising a primary settling tank, a biological oxidizing device connected therewith, an agitating compartment for receiving the sewage from the oxidizing device, means for introducing chemical material to said compartment, a stirrer in said compartment arranged to produce a violent agitation of the sewage and chemical material, a second compartment for receiving the mixed sewage and chemical material, means in said second compartment for maintaining the sewage and chemical material in their mixed condition, a secondary settling tank and a connection between said second compartment and the secondary settling tank.

9. Sewage disposal apparatus comprising a primary settling tank, a biological oxidizing device connected therewith, a compartment for receiving the sewage from the oxidizing device, regulable means for introducing chemical material to said compartment, a stirrer in said compartment arranged to produce a violent agitation of the sewage and chemical material, a second compartment for receiving the mixed sewage and chemical material, means in said second compartment for maintaining the sewage and chemical material in their mixed condition, a secondary settling tank, a connection between said second compartment and the secondary settling tank, regulable means for returning material from the lower part of the secondary settling tank to the upper part of the primary settling tank, and means for introducing chemical material to the returned material.

JOHN R. DOWNES.